June 19, 1923.
Re. 15,628
W. F. WAGNER
SUIT HANGER
Original Filed Oct. 17, 1921
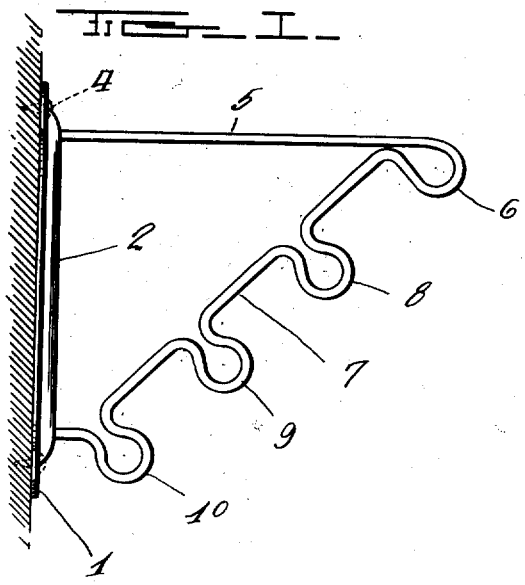
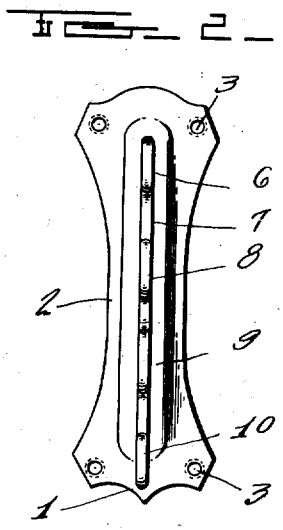
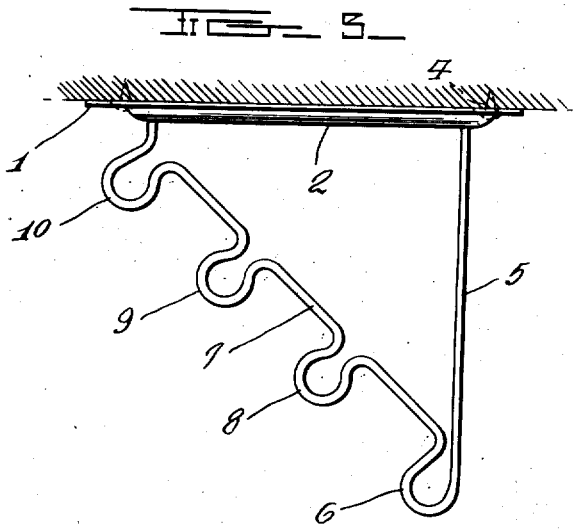
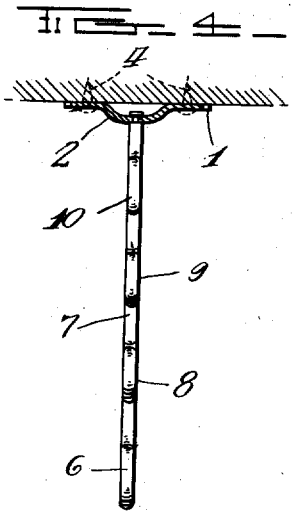
Inventor:
William F. Wagner,
by Titus Ulke, his Attorney.

Reissued June 19, 1923. Re. 15,628

UNITED STATES PATENT OFFICE.

WILLIAM F. WAGNER, OF WASHINGTON, DISTRICT OF COLUMBIA.

SUIT HANGERS.

Original No. 1,416,143, dated May 16, 1922, Serial No. 508,104, filed October 17, 1921. Application for reissue filed April 3, 1923. Serial No. 629,721.

*To all whom it may concern:*

Be it known that I, WILLIAM F. WAGNER, a citizen of the United States, residing at Washington, in the District of Columbia, have invented certain new and useful Improvements in a Suit Hanger, of which the following is a specification.

My invention relates to an improved support for articles of wearing apparel and the like, and has particular reference to suit hangers. The primary object of the invention is to provide such a hanger that is readily applied to a wall or shelf, permitting a maximum arrangement of clothing in a minimum of space.

Another object is to provide such a hanger that is readily adaptable for disposal in many various positions on walls, doors, shelves and the like.

A further object is the construction of such a hanger in a new and efficient manner in a distinctly novel form.

With these and such other objects in view as will be apparent from the description, my invention resides in the novel construction, combination, and arrangement of parts hereinafter described and claimed, taken in connection with the accompanying drawings, of which;

Figure 1 is a side elevation of the hanger as applied to a wall, door, or other vertical member, Figure 2, a front elevation thereof, Figure 3, a side elevation of the hanger applied to a shelf or other horizontal member, and Figure 4, a front elevation thereof.

In detail the invention preferably comprises a base plate 1 formed of any suitable material, as for example stamped metal, in any suitable form, which in the preferred embodiment is substantially rectangular, provided with a raised central longitudinal rib 2 stamped therein, and having apertures 3 for the reception of fastening screws 4, as will be understood.

At each end of the longitudinal rib 2 and in the channeled portion of the base plate formed thereby, are secured, as by riveting, the ends of a suitable element, such as the stiff wire member 5, which projects laterally from one end of the plate 1 a considerable distance and is looped upon itself to form the hanger loop 6 with the remaining portion of the wire extending at an angle to the other end of the rib 2, whereby the wire forms with the base plate a substantially right angled triangle. The hypotenuse portion of the wire is designated in its entirety as 7 and this portion is provided at spaced intervals with outwardly and downwardly extending loops 8, 9 and 10 formed in the wire in any suitable manner, as by bending it, and with the axis of said loops preferably positioned perpendicularly to the hypotenuse 7. By this arrangement said loops will occupy substantially the same angular relation relative to the vertical supporting surface whether the device be secured to a vertical or a horizontal supporting surface. The hanger is therefore reversible, and functions equally well whether secured, for example, on a vertical door, an inclined wall, or the bottom of a horizontal shelf, The angle of the portion 7 of the wire is such that the loops, 6, 8, 9, and 10 will be disposed in eschelon, each loop being of a size sufficient to permit of receiving therein the hook of a garment hanger (not shown).

In this preferred form the loops are four in number but it is obvious that they may be more or less as desired. Owing to its construction it may be readily applied to any vertical or horizontal surface by means of the fastening screws 4, permitting of its ready adaptability to closets where it is desired to store considerable clothing in a limited space, as garments hung therefrom will be disposed in close relation. The device is susceptible of many other uses, such as a bracket for supporting the ends of rods, in the loops, and while I have shown and described the invention as constructed in a particular manner for a particular use, of specified materials, I desire it to be understood that I do not intend to limit myself to these, but that any such may be used as will fall within the scope of the invention as claimed.

I claim:—

1. A device of the class described comprising a stamped metal base, having a central longitudinal rib pressed therefrom; and a hanger supporting member formed of a length of wire bent to provide two parallel portions, one being of a greater length than the other, extending from the base at opposits ends thereof and at right angles thereto, and a third connecting portion, joining the outer ends of the said two end portions, the said third portion being bent upon itself at spaced intervals to form outwardly projecting loops to support the hangers thereon.

2. A reversible device of the class described comprising a base portion and a hanger supporting member formed of an element shaped to provide two end portions, one being of a greater length than the other, extending from the base portion at opposite ends thereof and at right angles thereto, and a third connecting portion joining the outer ends of the said two end portions, the said third portion being provided at spaced intervals with outwardly projecting loops at right angles thereto to support the hangers thereon.

3. A reversible device of the character described comprising a triangular-shaped hanger one of the sides forming the base, and provided with means for securing it to a supporting surface, and a series of outwardly projecting loops located on the longest side of said triangle which side is sloped at an angle of approximately 45° to said base, and each loop positioned substantially perpendicularly thereto, whereby said loops will occupy substantially the same angular relation to the vertical whether the said device is secured to a vertical or a horizontal supporting surface.

4. A reversible device of the character described comprising a basal portion adapted to be secured to a supporting surface and an angular hanger portion extending outwardly and perpendicular to said basal portion and secured thereto, so as to form with it a substantially right-angled triangle, and a series of outwardly projecting loops provided in the hypotenuse of said hanger portion, each positioned substantially perpendicular thereto, whereby said loops will occupy substantially the same angular relation to the vertical whether the basal portion be secured to a vertical or horizontal supporting surface.

5. A reversible device of the character described comprising a rigid basal portion provided with means for securing it to a supporting surface, a one-piece and angular hanger portion secured to said basal portion perpendicularly thereto, and bent so as to form with said basal portion a right-angled triangle, and a series of outwardly projecting loops on the hypotenuse of said hanger portion and so positioned as to occupy substantially the same angular relation to the vertical surface whether the device be secured to a vertical or a horizontal supporting surface.

6. A reversible suit hanger, provided with means for securing it to a vertical, horizontal or inclined supporting plane surface, and shaped in the form of a substantially right-angled isoceles triangle, one side of which extends out relative to said surface and then is bent backwardly toward it to form the longest side of said triangle, said longest side comprising a plurality of outwardly projecting loops, each of whose axis of symmetry is perpendicular to the axis of said side and adapted to receive garment-supporting means.

This specification signed and witnessed this 23rd day of March, 1923, at Washington, D. C.

WILLIAM F. WAGNER.

Witness:
TITUS ULKE.